US012775822B2

(12) United States Patent
Kokiopoulou et al.

(10) Patent No.: US 12,775,822 B2
(45) Date of Patent: Oct. 27, 2026

(54) FLEXIBLE PARAMETER SHARING FOR MULTI-TASK LEARNING

(71) Applicant: Google LLC, Mountain View, CA (US)

(72) Inventors: Effrosyni Kokiopoulou, Horgen (CH); Krzysztof Stanislaw Maziarz, Cambridge (GB); Andrea Gesmundo, Zürich (CH); Luciano Sbaiz, Gattikon (CH); Gábor Bartók, Zürich (CH); Jesse Berent, Geneva (CH)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 18/404,553

(22) Filed: Jan. 4, 2024

(65) Prior Publication Data

US 2024/0185025 A1 Jun. 6, 2024

Related U.S. Application Data

(63) Continuation of application No. 16/820,829, filed on Mar. 17, 2020, now Pat. No. 11,915,120.

(30) Foreign Application Priority Data

Jan. 27, 2020 (GR) .............................. 20200100034

(51) Int. Cl.

*G06N 3/044* (2023.01)
*G06N 3/084* (2023.01)
*G06N 20/00* (2019.01)

(52) U.S. Cl.

CPC ............. *G06N 3/044* (2023.01); *G06N 3/084* (2013.01); *G06N 20/00* (2019.01)

(58) Field of Classification Search

CPC ......... G06N 3/044; G06N 20/00; G06N 3/084
See application file for complete search history.

(56) References Cited

U.S. PATENT DOCUMENTS

| | | | | |
|---|---|---|---|---|
| 10,748,065 | B2 * | 8/2020 | Wierstra | G06N 3/0442 |
| 2016/0329047 | A1 * | 11/2016 | Tur | G10L 13/08 |
| 2018/0157972 | A1 * | 6/2018 | Hu | G06N 3/00 |

OTHER PUBLICATIONS

Strezoski, Gjorgji, Nanne van Noord, and Marcel Worring. "Many task learning with task routing." Proceedings of the IEEE/CVF International Conference on Computer Vision. (Year: 2019).*

(Continued)

*Primary Examiner* — Adam C Standke

(74) *Attorney, Agent, or Firm* — DORITY & MANNING, P.A.

(57) ABSTRACT

Systems and methods for flexible parameter sharing for multi-task learning are provided. A training method can include obtaining a test input, selecting a particular task from one or more tasks, and training a multi-task machine-learned model for the particular task by performing a forward pass using the test input and one or more connection probability matrices to generate a sample distribution of test outputs, training the components of the machine-learned model based at least in part on the sample distribution, and performing a backwards pass to train a connection probability matrix of the multi-task machine-learned model using a straight-through Gumbel-softmax approximation.

20 Claims, 9 Drawing Sheets

(56) References Cited

OTHER PUBLICATIONS

Bansal et al., "Ask the GRU: Multi-Task Learning for Deep Tet Recommendations", $10^{th}$ ACM Conference on Recommender Systems, Boston, Massachusetts, Sep. 2016, pp. 107-114.
Bengio et al., "Conditional Computation in Neural Networks for Faster Models", arXiv:1511.06297v2, Jan. 7, 2016, 12 pages.
Caruana, "Multitask Learning: A Knowledge-Based Source of Inductive Bias", In Machine Learning: Proceedings of the Tenth International Conference, 1993, pp. 41-48.
Caruana, "Multitask Learning", Learning to Learn, 1997, pp. 41-75.
Fernando et al., "Pathnet: Evolution Channels Gradient Decent in Super Neural Networks", arXiv:1701.08734v1, Jan. 30, 2017, 16 pages.
Girshick, "Fast R-CNN", arXiv:1504.08083v2, Sep. 27, 2015, 9 pages.
Maziarz et al., "Gumbel-Matrix Routing for Flexible Mutli-Task Learning", 2019, arXiv:1910.04915v1, Oct. 10, 2019, 15 pages.
Guo et al., "SpotTune: Transfer Learning through Adaptive Fine-Tuning", 2018, arXiv:1811.08737v1, Nov. 21, 2018, 10 pages.
Jang et al., "Categorical Reparametrization with Gumbel-Softmax", arXiv:1611.01144, Aug. 5, 2017, 13 pages.
Lake et al., "Human-Level Concept Learning through Probabilistic Program Induction", Science, Dec. 11, 2015, vol. 350, Issue 6266, pp. 1332-1338.
Liang et al., "Evolutionary Architecture Search for Deep Multitask Networks", arXiv:1803.03745v2, Apr. 17, 2018, 8 pages.
Liu et al., "DARTS: Differentiable Architecture Search", arXiv:1806.09055v2, Apr. 23, 2019, 13 pages.
Ma et al., "Modeling Task Relationships in Multi-Task Learning with Multi-Gate Mixture-of-Experts", KDD, Aug. 19-23, 2018, pp. 1930-1939.
Ma et al., "SNR: Sub-Network Routing for Flexible Parameter Sharing in Multi-task Learning", AAAI Conference on Artificial Intelligence, 2019, 8 pages.
Meyerson et al., "Beyond Shared Hierarchies: Deep Multitask Learning through Soft Layer Ordering", International Conference on Learning Representations, Vancouver, Canada, Apr. 30-May 3, 2018, 14 pages.
Misra et al., "Cross-Stitch Networks for Multi-Task Learning", Conference on Computer Vision and Pattern Recognition, 2016, pp. 3994-4003.
Pham et al., "Efficient Neural Architecture Search via Parameters Sharing", International Conference on Machine Learning, Stockholm, Sweden, Jul. 10-15, 2018, 10 pages.
Ramachandran et al., "Diversity and Depth in Per-Example Routing Models", International Conference on Learning Representations, 2019, 12 pages.
Real et al., "Large-Scale Evolution of Image Classifiers", International Conference on Machine Learning, Sydney, Australia, Aug. 6-11, 2017, 10 pages.
Rosenbaum et al., "Routing Networks: Adaptive Selection on Non-Linear Functions for Multi-Task Learning" International Conference on Learning Representations, Vancouver, Canada, Apr. 30-May 3, 2018, 16 pages.
Rosenbaum et al., "Routing Networks and the Challenges of Modular and Compositional Computation" arXiv:1904.12774v1, Apr. 29, 2019, 28 pages.
Shazeer et al., "Outrageously Large Neural Networks: The Sparsely-Gated Mixture-of-Experts Layers", arXiv:1701.06538v1, Jan. 23, 2017, 19 pages.
Veit er al., "Convolutional Networks with Adaptive Inference Graphs", arXiv:1711.11503, Jul. 24, 2018, 16 pages.
Williams, "Simple Statistical Gradient-Following Algorithms for Connectionist Reinforcement Learning", Machine Learning, vol. 8, Issues 3-4, 1992, pp. 229-256.
Wu et al., "Group Normalization", arXiv:1803.08494v3, Jun. 11, 2018, 10 pages.
Zoph et al., "Neural Architecture Search with Reinforcement Learning", International Conference on Learning Representations, Toulon, France, Apr. 24-26, 2017, 16 pages.

* cited by examiner

FLEXIBLE PARAMETER SHARING FOR MULTI-TASK LEARNING

PRIORITY CLAIM

The present application is a continuation of U.S. application Ser. No. 16/820,829 having a filing date of Mar. 17, 2020, which is based on and claims the right of priority under 35 U.S.C. § 119 to Greek National application No. 20200100034 having a filing date of Jan. 27, 2020. Applicant claims priority to and the benefit of each of such applications and incorporate all such applications herein by reference in its entirety.

FIELD

The present disclosure relates generally to multi-task machine-learned models. More particularly, the present disclosure relates to systems and methods which use standard back-propagation to train multi-task routing network components and connection probabilities.

BACKGROUND

Multi-task neural networks can learn to transfer knowledge across different tasks by using parameter sharing. However, sharing parameters between unrelated tasks can hurt performance. For example, in a shared-bottom architecture, several shared layers can each be used for a plurality of tasks, and the outputs of the shared layers can be routed through task-specific heads to generate a task specific output. However, when the tasks are unrelated or only slightly related, the accuracy of the neural network can suffer, resulting in significant loss.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for training a machine-learned model for flexible-multi-task learning. The machine-learned model can be configured to perform a plurality of tasks. The machine-learned model can include a plurality of layers. Each layer can include a plurality of components. Each task can be assigned to select one or more components for each layer according to a connection probability matrix for the layer. The connection probability matrix can include a matrix indicative of a probability of a particular component being activated such that an input into the machine-learned model is routed through the activated components to generate an output. The method can include obtaining a test input. The method can further include selecting a particular task from the one or more tasks. The method can further include training the machine-learned model for the particular task. Training the machine-learned model for the particular task can include performing a forward pass using the test input and one or more connection probability matrices to generate a sample distribution of test outputs. Training the machine-learned model for the particular task can further include training the components of the machine-learned model based at least in part on the sample distribution. Training the machine-learned model for the particular task can further include performing a backwards pass to train the connection probability matrix of the machine-learned model using an approximation.

Another example aspect of the present disclosure is directed to a computing system. The computing system can include at least one processor. The computing system can further include a multi-task machine-learned model configured to perform a plurality of tasks T. The multi-task machine-learned model can include a plurality of layers L, each layer comprising a plurality of components C. The multi-task machine-learned model can further include a routing matrix of size T×C associated with each respective layer. T routing matrix for a particular layer can include a matrix of binary allocation variables descriptive of which components in the respective layer an input into the machine-learned model is routed through to generate an output. The multi-task machine-learned model can further include a plurality of task-specific heads. Each task-specific head can be configured to receive an output from a final layer of the one or more layers and generate an output associated with a respective task. The computing system can further include at least one tangible, non-transitory computer-readable medium that stores instructions that, when executed by the at least one processor, cause the at least one processor to perform operations. The operations can include obtaining an input. The operations can further include selecting a particular task. The operations can further include routing the input through the machine-learned model according to the respective routing matrix for each layer for the particular task. The operations can further include receiving, as an output of the machine-learned model, a task-specific output from the task-specific head associated with the particular task. The multi-task machine-learned model can have been trained using a straight-through Gumbel-softmax approximation to jointly learn the routing matrix with the plurality of components using back-propagation.

Another example aspect of the present disclosure is directed to one or more tangible, non-transitory computer-readable media that store instructions that, when executed by one or more processors, cause the one or more processors to perform operations. The operations can include obtaining a test input for a machine-learned model configured to perform a plurality of tasks. The machine-learned model can include a plurality of layers. Each layer can include a plurality of components. Each task can be assigned to select one or more components for each layer according to a connection probability matrix for each respective layer. The connection probability matrix for each layer can include a matrix of connection probabilities for each component to be used in the respective layer for the task. Each connection probability can include two complementary logits. The operations can further include selecting a particular task from the one or more tasks. The operations can further include training the machine-learned model for the particular task. Training the machine-learned model for the particular task can include performing a forward pass using the test input and the connection probability matrix for each layer to generate a sample distribution of test outputs. Training the machine-learned model for the particular task can further include training the components of the machine-learned model based at least in part on the sample distribution. Training the machine-learned model for the particular task can further include performing a backwards pass to train the connection probability matrix of the machine-learned model using a straight-through Gumbel-softmax approximation.

Other aspects of the present disclosure are directed to various systems, methods, machine-learned models, apparatuses, non-transitory computer-readable media, and computing devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
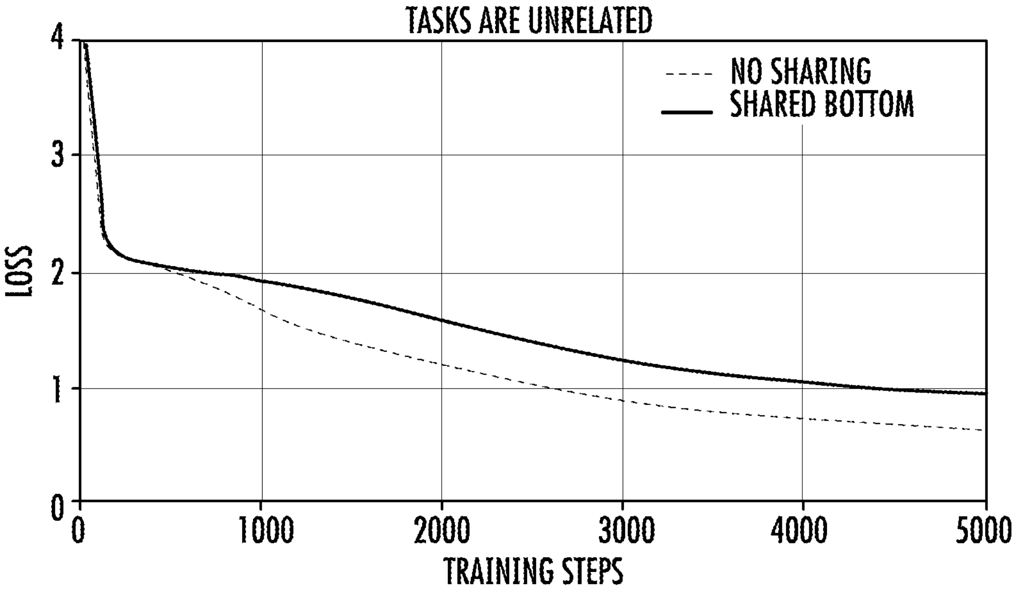
FIG. 1 depicts a plot showing the relative performance of two example machine-learned models for unrelated tasks according to example aspects of the present disclosure.

Reference numerals that are repeated across plural figures are intended to identify the same features in various implementations.

DETAILED DESCRIPTION

Overview

Generally, the present disclosure is directed to systems and methods for learning a multi-task machine-learned model using standard back-propagation. For example, a machine-learned model can be configured to perform a plurality of tasks T. In some implementations, the machine-learned model can include a plurality of layers L, with each layer including a plurality of components C. Each task performed by the machine-learned model can be assigned to select one or more components for each layer according to a routing matrix of size T×C. For example, in some implementations the routing matrix can be a matrix of binary allocation variables (e.g., 1 or 0) descriptive of which components in each layer an input into the machine-learned model is routed through to generate an output. In some implementations, the routing matrix can be a connection probability matrix, wherein the connection probability matrix comprises a matrix indicative of a probability of a particular component being activated such that an input into the machine-learned model is routed through the activated components to generate the output.

In particular, a training method for a machine-learned model can include obtaining a test input. For example, the test input can be included in a larger training database. A particular task $T_i$ from the one or more tasks can be selected for training The machine-learned model can then be trained for the particular task. For example, in some implementations, training the machine-learned model for the particular task can include performing a forward pass using the test input and a connection probability matrix to generate a sample distribution of test outputs. The method can further include training the components of the machine-learned model based at least in part on the sample distribution. A backwards pass can be performed to train the connection probability matrix using an approximation. For example, in some implementations, the approximation can be straight-through Gumbel-softmax approximation, and in other implementations, the approximation can be a reinforcement learning (RL) approximation. For example, in some implementations, standard back-propagation, such as gradient descent, can be used to train both the components of the machine-learned model and the connection probability matrix. In some implementations, following a plurality of training iterations, the connection probability matrix can be used to generate a routing matrix to be used for inference for the particular task. For example, a maximum likelihood variant for each connection probability in the connection probability matrix can be selected as a corresponding binary value in the rating matrix.

Multi-task learning based on neural networks has generated a large amount of research interest in recent years and has been successfully applied to several application domains, such as recommender systems and real-time object detection. For example, a movie recommendation system may optimize not only the likelihood of the user clicking on a suggested movie, but also the likelihood that the user is going to watch it.

An example common architecture used in practice for multi-task learning is the so-called shared bottom architecture, where the tasks share parameters in the early layers of the model (e.g., a neural network), which are followed by task-specific heads. However, experiments on synthetic data have shown that when the tasks are unrelated, parameter sharing may hurt individual task performance.

An approach to improving performance is to use flexible parameter sharing. This can be achieved by manually trying several different static sharing patterns by, for example, manually selecting which components in a particular layer are used for each task. However, this option may have limited feasibility at scale, since it can require significant effort to manually assign connection patterns.

At the same time, routing networks have been introduced as powerful models, which route each input sample through its own path, selectively activating only parts of the network. Routing networks have shown strong performance in various settings due in part to their high flexibility. Routing networks thus may have advantages for learning sharing patterns in multi-task modeling. However, in practice, routing networks can be difficult to train.

The systems and methods of the present disclosure, however, allow for learning a sharing pattern jointly with the model parameters using standard back-propagation. For example, an example machine-learned model, such as a multi-task routing network, can include several layers, where each layer can include several components. An example method according to example aspects of the present disclosure can learn, for each component, a set of binary allocation variables indicating which tasks use this component using a Gumbel-softmax reparameterization method to train the binary variables jointly with the parameters of the components.

For example, during a forward pass, a sample distribution of test outputs can be generated using a test input and a connection probability matrix. For example, a plurality of different routing matrices can be used wherein each routing matrix is a binary matrix indicative of which components in each layer are activated. The test input can be routed through the activated components in each layer of the machine-learned model according to the respective routing matrix to generate a respective test output. The sample distribution of test outputs can then be generated by sampling the plurality of test outputs according to the connection probability matrix.

For example, in some implementations, for a particular routing matrix, the test input can be input into one or more activated components of a first layer of the machine-learned model according to the routing matrix. An output from each activated component can then be received and aggregated into an aggregated output. For example, in some implementations, the aggregated output can include an average of the respective outputs. The aggregated output can then be input into the activated components of a successive layer according to the routing matrix, and a successive aggregated output can be generated for each successive layer. The aggregated output of a final layer and then be input into a task-specific head to generate a test output for a particular routing matrix.

The components of the machine-learned model can then be trained based at least in part on the sample distribution. For example, in some implementations, standard back-propagation, such as a gradient descent, can be used to train the activated components of a particular routing pathway. For example, the test database can include a ground-truth output corresponding to a desired output for a particular task. The gradient descent can be determined based at least in part on a difference between a test output for a particular routing matrix and the ground-truth output. The components of the machine-learned model which were activated using the particular routing matrix can then be trained using back-propagation.

A backwards pass can be used to train the connection probability matrix of the machine-learned model using an approximation. In some implementations, the approximation can be a straight-through Gumbel-softmax approximation. For example, in some implementations, each connection probability in the connection probability matrix can include two complementary logits.

Performing the backwards pass can include reparameterizing the sample distribution from a Bernoulli distribution to a Gumbel distribution. For example, independent noise can be added from the Gumbel distribution to each of the logits and a binary value with the highest logit can be selected as the sample distribution. An argmax function can be used to obtain a binary connection value on the forward pass, and the binary connection value can be approximated on the backwards pass using a softmax function. The connection probabilities can then be trained using back-propagation, as even inactive components will have gradients which can be used to compute the corresponding gradient for a connection probability. In this way, the connection probabilities of the connection probability matrix can be trained jointly with the components of the machine-learned model.

The systems and methods of the present disclosure can provide any number of technical effects and benefits. For example, the systems and methods of the present disclosure can allow for learning flexible parameter sharing which can adapt to task relatedness. Moreover, both the components of a machine-learned model as well as the connection probabilities of a connection probability matrix can be jointly trained using standard back-propagation techniques. This can allow for scalable learning of flexible parameter sharing in an efficient manner.

Further, the systems and methods of the present disclosure can provide for more accurate multi-task machine-learned models to be learned. For example, the example machine-learned models of the present disclosure can outperform previously developed routing networks.

Moreover, the systems and methods of the present disclosure can more efficiently determine routing patterns of a machine-learned model, which can allow for implementation at scale. Additionally, in some implementations, a budget penalty can be used to train a machine-learned model and prevent the machine-learned model from exceeding a computational budget. This can allow for creating lighter-weight machine-learned models which can be used in a variety of applications.

With reference now to the FIGS., example aspects of the present disclosure will be discussed in further detail.

Background of Positive and Negative Transfer for Tasks

Figure 2:
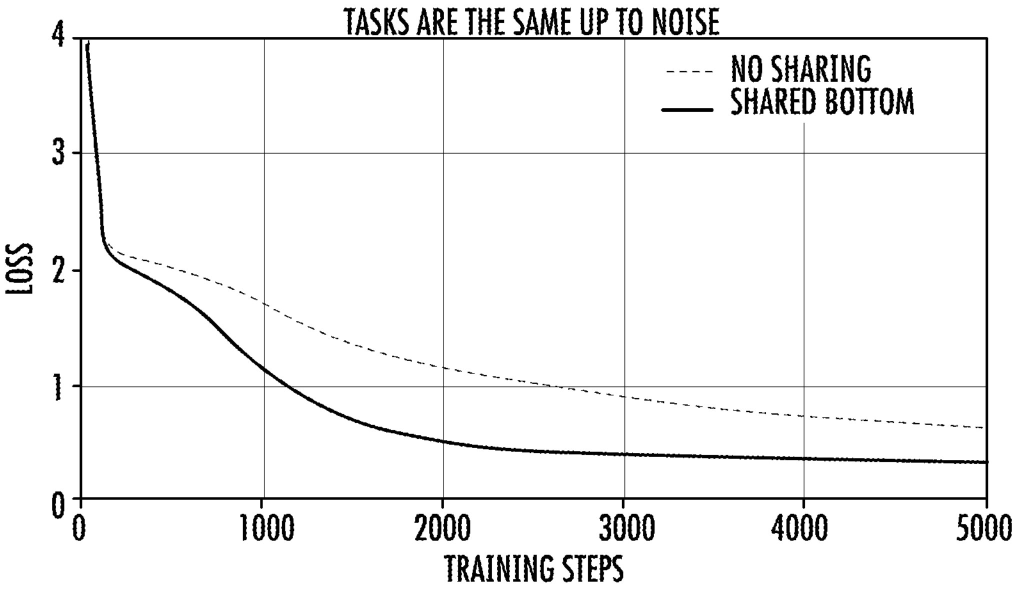
FIG. 2 depicts a plot showing the relative performance of two example machine-learned models for related tasks according to example aspects of the present disclosure.

FIGS. 1 and 2 depict plots of example negative and positive transfer between related and unrelated tasks for two different network architectures. As shown, when tasks are unrelated, allowing the tasks to interact in a bigger model instead of training them separately can harm the model performance.

For example, to evaluate whether both positive and negative transfer can occur, two synthetic tasks, where the task relatedness ρ was explicitly controlled were evaluated. Synthetic data was generated, in which two edge cases two edge cases were evaluated: two unrelated tasks (ρ=0) as shown in FIG. 1, and two tasks that were the same up to noise (ρ=1) as shown in FIG. 2.

A simple multi-task network was created consisting of 4 parallel components, and each component contained a stack of fully connected layers in order to evaluate positive and negative transfer. Each input example could be provided as input to any subset of the 4 parallel components and the outputs of the components were averaged before being passed to a task-specific linear head. The simple network architecture was chosen to have low capacity to encourage visible competition between tasks.

For both analyses, two hard-coded sharing patterns were used. For the "shared bottom" pattern, both tasks used all components, while for the "no sharing" pattern, the tasks used disjoint halves of all components. Stated differently, in the "no sharing" pattern, the tasks were completely independent. For each analysis, the total amount of parameters in the model remained the same; the only difference was which parameters were used by which tasks. The "no sharing" corresponded to imposing a constraint that the network was evenly divided between the tasks, while "shared bottom" allowed the optimization algorithm to decide.

Four experiments were evaluated: one for every combination of sharing pattern ("shared bottom" and ""no sharing"), and task relatedness ($\rho \in \{0, 1\}$). For each experiment, the L2 loss over time averaged over the two tasks is shown in FIGS. 1 and 2. For the "no sharing", there was no interaction between the tasks, thus the average loss behaved in the same way irrespective of the task relatedness. For the "shared bottom", both tasks were allowed to update all parameters. The results showed performance was improved if the tasks were related, while the L2 loss was negatively impacted for two completely unrelated tasks. The plots shown in FIGS. 1 and 2 indicate that general multi-task models may benefit from being able to learn flexible sharing patterns that are able to adapt to the task relatedness.

Example Machine-Learned Models

Figure 3:
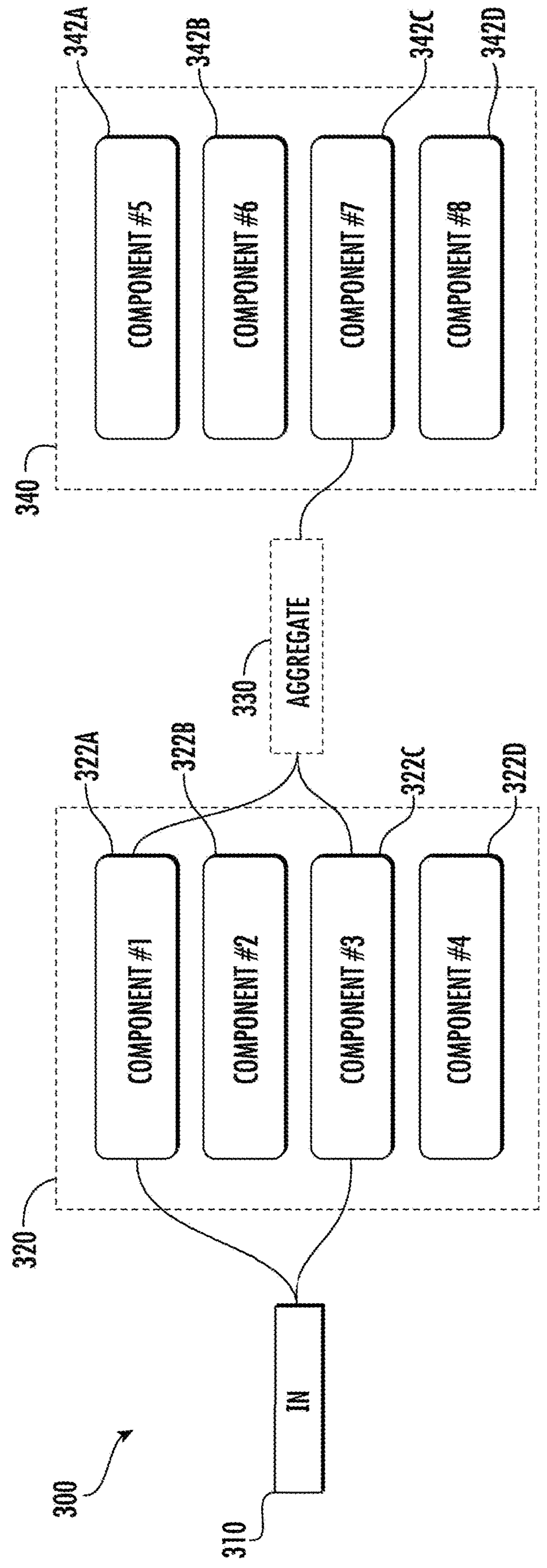
FIG. 3 depicts an example generic routing network according to example aspects of the present disclosure.

Standard neural networks process every input example in the same way. Routing networks, such as the routing network 300 depicted in FIG. 3, provide a more flexible alternative, where every input can be passed through a subgraph of the entire machine-learned model (also referred to as the supernetwork). For example, the routing network 300 is divided into layers 320 and 340, and some layers 320/340 contain multiple parallel components 322A-D/342A-D (also called modules or experts). Inputs 310 to the routing network 300 are routed through some sets of components 322A-D/342A-D in subsequent layers 320/340.

For example, as shown in FIG. 3, an input 310 is routed through a plurality of components 322A and 322C in a first layer 320. The outputs of the layers 322A and 322C are aggregated at 330, which is then input into a component 342C in a second layer 340.

The generic framework depicted in FIG. 3 can be used in both single-task and multi-task setups. In some implementations, the number of components 322A-D/342A-D used can vary between layers 320/340 and between individual inputs 310. After passing an input 310 through a single routed layer 320/340, the outputs of all activated components 322A-D/342A-D can be aggregated to form an input to the next layer 320/340. In some implementations, the average can be used as the aggregation.

Figure 4:
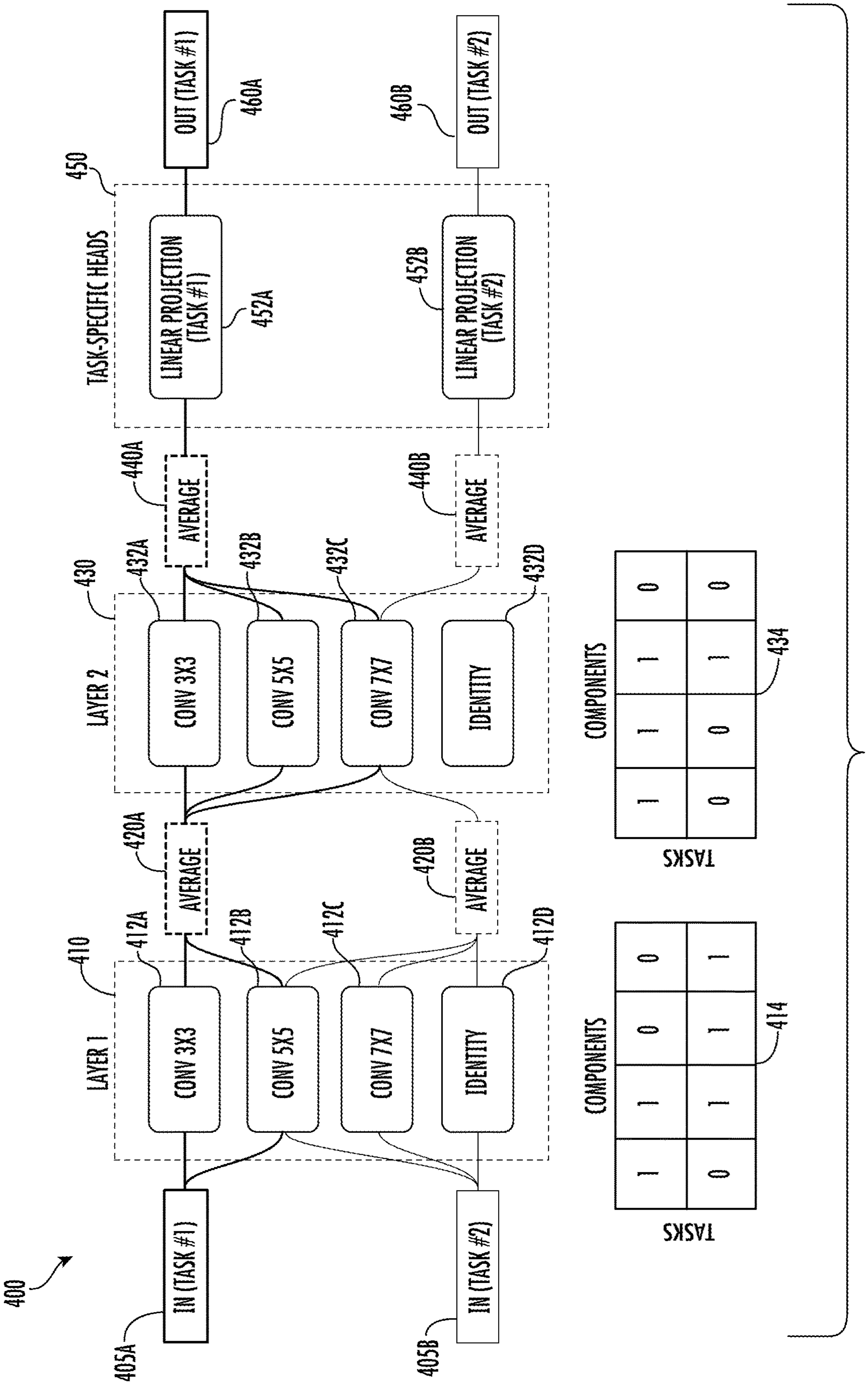
FIG. 4 depicts an example multi-task machine-learned model according to example aspects of the present disclosure.

Referring now to FIG. 4, an example multi-task machine-learned model 400 is depicted. The machine-learned model 400 is a multi-task routing network which can learn to select task-conditioned subgraphs of a larger computational graph. For example, in some implementations as shown in FIG. 4, the routing pathway through the layers 410 and 430 can be conditioned on the task ID only. In other implementations, the routing pathways can be conditioned not only on the task ID but also on other types of information, such as a task embedding. As shown, there are two tasks, and two routed layers 410 and 430. Each task selects some subset of components 412A-D/432A-D within every layer 410/430. For every routed layer 410/430, the component assignment can be encoded as a binary matrix 414/434 (also referred to as a routing matrix). Concretely, if there are T tasks, and C components in a given layer, the routing matrix for each layer has shape T×C, where the entry in the i-th row and j-th column is 1 if the i-th task uses the j-th component. Note, some components can correspond to the identity. Any number of tasks, components, layers, etc. can thus be represented by a similar machine-learned model. Moreover, any number of inputs can be routed through the machine-learned model.

Example tasks can include image processing, (e.g., computer vision, character recognition, semantic segmentation, etc.), language processing (e.g., next word prediction, translation, etc.), audio processing (e.g., speech recognition, etc.), and/or other machine-learned tasks. For example, a mixture-of-experts machine-learned model can perform multiple computer vision tasks, such as pose estimation and object identification using a common input.

For example, as depicted in FIG. 4, a first input 405A for a first task is routed through components 412A and 412B in a first layer 410. The outputs of the components 412A and 412B are aggregated (e.g., averaged) at 420A. Thus, the binary routing matrix 414 for the first task corresponding to the first layer 410 has a "1" in an entry corresponding to components 412A and 412B, whereas it has "0" in an entry corresponding to components 412C and 412D.

Similarly, a second input 405B for a second task is routed through components 412B, 412C, and 412D in the first layer 410. The outputs of the components for 412B, 412C, and 412D are then aggregated (e.g., averaged) at 420B. Thus, the binary routing matrix 414 for the second task corresponding to the first layer 410 has a "0" in an entry corresponding to component 412A, and a "1" in entries corresponding to components 412B, 412C, and 412D. In some implementations, the inputs 405A and 405B can be the same input (e.g., a single input) routed through the multi-task machine-learned model 400 for two separate tasks.

As shown, the aggregated outputs 420A and 420B are then input into the second layer 430 using a second routing matrix 434. For example, as shown, the first aggregated output 420A is input into components 432A, 432B, and 432C, and corresponding entries in routing matrix 434 thus have a "1," while the entry for 432D has a "0." Similarly, second aggregated output 420B is only routed through component 432C, thus entries in the routing matrix 434 corresponding to components 432A, 432B, and 432D have a "0," while entry for 432C has a "1."

The outputs of the components 432A, 432B, and 432C for the first task are then aggregated (e.g., averaged) at 440A, and the outputs of component 432C for the second task is aggregated (e.g., averaged) at 440B. The aggregated outputs 440A and 440B are then input into task specific heads 450. For example, the first aggregated output 440A is input into a first task-specific head 452A, and a second aggregated output 440B is input into a second task-specific head 452B. A first output 460A for the first task is then received from the first task-specific head 452A, and a second output 460B for the second task is then received from the second task-specific head 452B.

Example Training Methods

The example training methods of the present disclosure can improve (e.g., optimize, maximize) the average per-task performance of the model 400. For example, in order to learn the routing matrix 400, the example method can first condition on the task id, which implies that all samples from the same task will go through the same path in the network. This framework is referred to as the Gumbel-matrix routing framework.

For example, for each layer, the training method of the present disclosure can maintain a probability distribution over all possible binary routing matrices. The sample distribution can be assumed to be factorized, and a matrix of per-connection probabilities can be maintained.

Figure 5C:
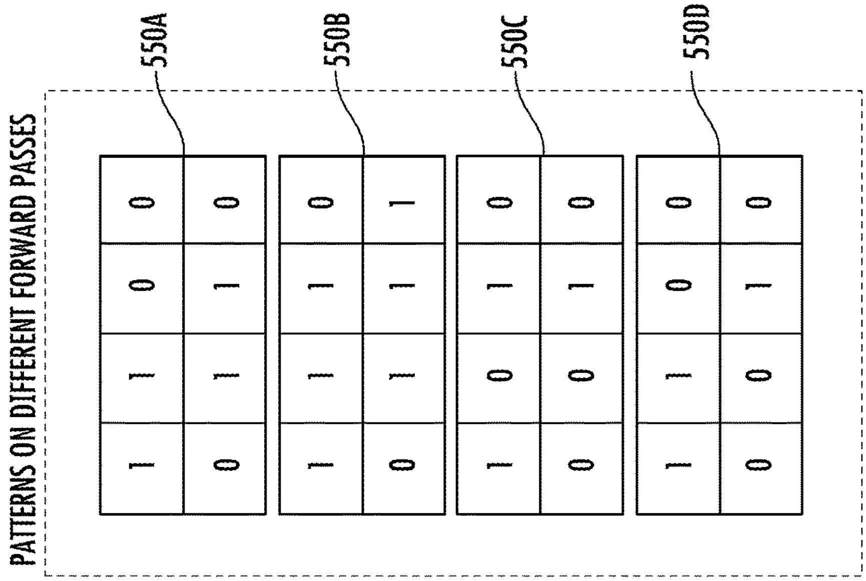
FIG. 5C depicts a plurality of example routing matrices on a plurality of forward passes according to example aspects of the present disclosure.
Figure 5B:
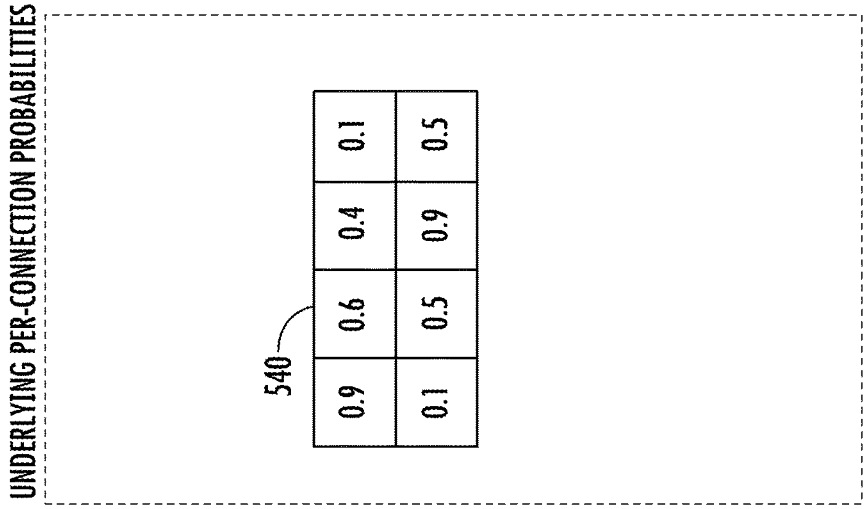
FIG. 5B depicts an example connection probability matrix according to example aspects of the present disclosure.
Figure 5A:
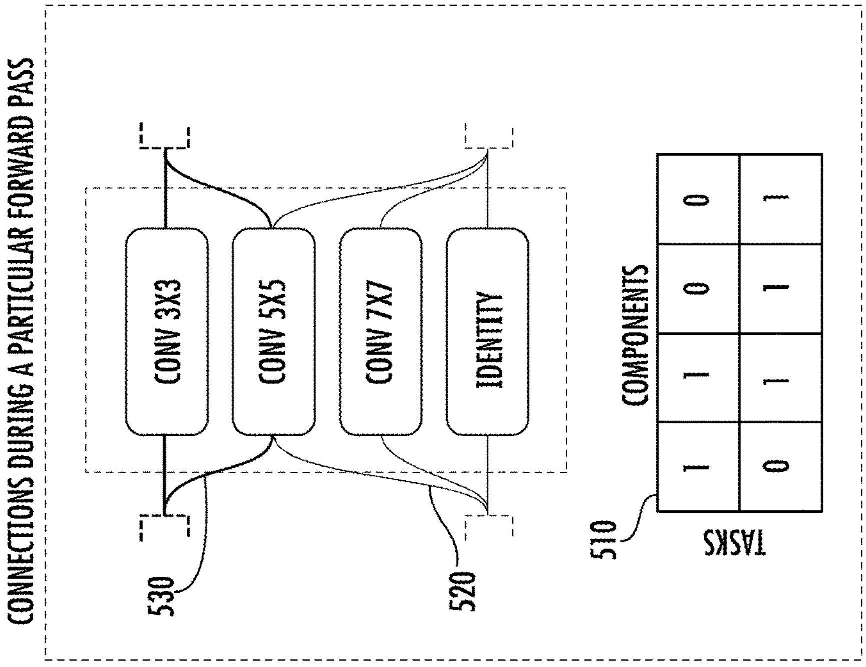
FIG. 5A depicts example connections during a particular forward pass according to example aspects of the present disclosure.

For example, referring to FIG. 5A, an example routing matrix 510 indicating connections during a particular forward pass and the associated routing pathways 520/530 are depicted. Stated differently, the routing matrix 510 indicates which components are activated for each task for the respective task's routing pathway.

In FIG. 5B, a connection probability matrix 540 is depicted. The connection probability matrix 540 is a matrix indicative of a probability of a particular component being activated such that an input into the machine-learned model is routed through the activated components to generate an output. For example, rather than a binary routing matrix 510 as shown for the particular forward pass in FIG. 5A, in FIG. 5B, the connection probability matrix 540 shows the underlying per-connection probabilities for a particular connection. In some implementations, each connection probability can be represented as a pair of two complementary logits.

According to example aspects of the present disclosure, a machine-learned model, such as a machine-learned model 400 depicted in FIG. 4, can be trained by performing a forward pass using a test input and a connection probability matrix 540 to generate a sample distribution of test outputs. To perform the forward pass, all binary connections can be sampled independently according to the connection probability matrix 540. For example, as shown in FIG. 5C, a plurality of binary routing matrices 550A-D are shown, which can be generated using the connection probability matrix 540. In some implementations, it is possible that for a given task, all connections are sampled to 0. In that case, the output of a routed layer would be a zero vector, independently of the input. However, experimental results indicate that this happens very rarely, and mostly at the beginning of training, since usually one of the connection probabilities in the connection probability matrix 540 quickly becomes close to 1.

In some implementations, the connection probabilities in a connection probability matrix 540 can be initialized by being set to some initial values. In some implementations, prior knowledge can be introduced such that the connection probabilities are set in a way that encourages or discourages certain patterns (e.g., routing pathways). In some implementations, all connection probabilities can be initialized to the same constant value $p_{init}$. For example, setting $p_{init}=0.5$ can allow for the highest routing entropy, and corresponds to the weakest prior knowledge. In some implementations, such as for routing in large and deep networks, it may be beneficial to set $p_{init}$ closer to 1, in order to enhance the trainability of the components and to stabilize the initial learning phases.

According to example aspects of the present disclosure, in a training backwards pass, only the components which were activated will get gradients, as the inactive components do not contribute to the final output of the machine-learned model. However, in order to get a gradient for the connection probabilities, the training method needs to back-propagate through sampling. This can be performed using a straight-through Gumbel-softmax approximation according to example aspects of the present disclosure.

For example, in some implementations, in order to get gradients to the connection probabilities, sampling from a Bernoulli distribution of sample outputs can be reparameterized to a Gumbel distribution by using the Gumbel-softmax approximation. The Gumbel distribution can be defined by the following forward sampling procedure:

$$u \sim \text{Uniform}(0,1) \Rightarrow g = -\log(-\log(u)) \sim \text{Gumbel}.$$

In some implementations, rather than using the logits to directly sample a binary value, independent noise can be added from the Gumbel distribution to each of the logits, and the binary value with the highest logit (i.e. argmax) can be selected as the sample z.

For example, to sample from Bernoulli(p), the following procedure can be used. First, let $\pi=[p, 1-p]$; $g_0$ and $g_1$ can then be drawn from the Gumbel distribution, and a sample z can be produced as:

$$z =_{i \in \{0,1\}} v_i, \text{ where } v:=\log(\pi)+[g_0, g_1].$$

The argmax operation is not differentiable, but it can be approximated by a softmax with annealing temperature. Therefore, on the forward pass, the argmax can be used to obtain a binary connection value, while on the backwards pass, it can be approximated with softmax. This approach is known as the straight-through Gumbel-Softmax approximation. Note that the backwards pass will require all components to be evaluated, irrespective of whether they are used in the forward pass or not. Thus, if a connection is sampled to be inactive, the corresponding component will not get gradients, but its output will be used to compute the gradient for the connection probability.

In some implementations, the machine-learned model can be trained using a reinforcement learning (RL) solution to train the probability connection matrix. For example, the REINFORCE algorithm can be used rather than the Gumbel-Softmax approximation.

While during training, the example method according to example aspects of the present disclosure will sample many different routing matrices, at the end a single matrix can be selected for each layer. For example, at inference time, the routing matrices are fixed, and thus the routing does not add any overhead over the underlying non-routed model.

In some implementations, at inference time, it is possible to follow the same procedure as at training time, i.e. sample the connection pattern for every test batch. In some such implementations, this may not introduce a large amount of noise in the evaluation result, since the connection probabilities naturally tend to converge to either 0 or 1 during training. In some alternate implementations, the connection probabilities can be fixed to their maximum likelihood variants, and a corresponding routing pattern can be used for every forward pass. For example, the maximum likelihood variant for each connection probability in a connection probability matrix can be selected as a corresponding binary value in a routing matrix used for inference. Further, when using a maximum likelihood approach, the connection probabilities can be discarded after the training has completed, as the probabilities are used only to describe how to select a subgraph of the network for each task.

According to additional aspects of the present disclosure, in some implementations, the multi-task machine-learned model can be trained using a budget penalty. For example, a budget penalty can be used to learn a routing pattern with a certain degree of sparsity. The budget penalty can penalize the model from exceeding a given computational budget. The budget can be defined as a maximum percentage of active connections. The connection probabilities can be summed up over all layers to obtain the expected number of connections $e_c$ for a forward pass at a given point in time. The budget $b \in (0, 1\rangle$ can be set corresponding to the maximum allowed fraction of active connections (e.g., activated components). The budget auxiliary loss can be defined as $\lambda \max(0, e_c - b)$, where $\lambda$ is a constant that controls the strength of the penalty. When a sufficiently large $\lambda$ is used, the penalty can essentially operate as a hard constraint.

The example methods, systems, and machine-learned models of the present disclosure provide an improvement to traditional work on multi-task learning, such as hand-designing the sharing pattern in order to strike a good balance between shared and task-specific parameters. The example methods of the present disclosure allow for the sharing pattern to be learned jointly with the model parameters.

Example Experimental Results

The example systems, methods, and machine-learned models of the present disclosure were evaluated against previous machine-learned models.

In each of the experiments, an additional constraint was imposed that each input batch contains samples for only one task. Since the routing was conditioned on the task only, this allowed for sampling the connection pattern once per forward pass. To train a network in a multi-task setting, one batch of input samples per task was drawn, passed through the network in random order, and the process repeated for a predefined number of steps.

To test the example methods of the present disclosure in a controlled environment where task relatedness was known, the MNIST dataset was used. A first task, MNIST-rot, was defined by taking the input-output pairs of MNIST and rotating all input images clockwise by 90 degrees. Experiments were run on 4 tasks, where the first two tasks were copies of MNIST, and the next two are copies of MNIST-rot. The two copies of the same task had the same training and test datasets, but the order of batches was different. A relatively small routed network consisting of three routed layers, containing four components each was used. The components in the first routed layer were 5×5 convolutions, while in the second and third layers the components were 3×3 convolutions. After the last routed layer, the output feature map was flattened, and passed through a task-specific linear head.

Two baselines were also generated corresponding to the "no sharing" and "shared bottom" patterns discussed herein. The "no sharing" variant corresponded to the i-th of the four tasks using only the i-th component in every layer. This meant that there were no interactions between tasks. "Shared bottom" means that all tasks use all components. The "shared bottom" strongly outperformed "no sharing", which demonstrated that the routed network was small even for MNIST and using one component per layer was not enough to reliably learn the task.

Next, two variants of a Gumbel-Matrix machine-learned model according to example aspects of the present disclosure were trained: one without any auxiliary penalties, and one with the budget constraint set to 0.75. The results of all four variants are shown in Table 1. The two copies of MNIST end up using the same routing patterns, as well as the two copies of MNIST-rot. However, the patterns used by the copies of MNIST were different from the ones used by MNIST-rot. As seen in the results, this allowed for better performance, since the processing was task-dependent. Furthermore, when the budget penalty was used, the number of active connections were reduced without sacrificing test accuracy.

TABLE 1

Results on the 4-MNISTs multitask setup (mean and standard deviation of the error shown). Each experiment was run 30 times.

| Method | Test accuracy (%) | Active connections (%) |
|---|---|---|
| No sharing | 93.5 ± 5.1 | 25 |
| Shared bottom | 95.7 ± 0.5 | 100 |
| Gumbel-Matrix | 96.8 ± 0.2 | 96 |
| Gumbel-Matrix (budget = 0.75) | 96.7 ± 0.3 | 75 |

A second experiment was run using the Omniglot multi-task setup dataset. The Omniglot dataset consists of 50 different alphabets, each containing some number of characters. Input samples for each of the characters are handwritten grayscale images of size 105×105.

For the evaluation, each alphabet was treated as a separate task of predicting the character class. A fixed random subset of 20 alphabets was used, splitting every alphabet into training/validation/test sets with proportions 50%/20%/30%.

In order to have a direct comparison with previously-evaluated networks, the same underlying network, optimizer, and regularization techniques were used, with only the routing algorithm changed.

The network consisted of one shared 1×1 convolution, followed by 8 routed layers, and finally linear task-specific heads. Each routed layer contained 7 different components: conv 3×3→conv 3×3, conv 5×5→conv 5×5, conv 7×7→conv 7×7, conv 1×7→conv 7×1, 3×3 max pooling, 3×3 average pooling, identity. The number of channels was 48 throughout the network. All components used padding to make sure the output shape was the same as the input shape; the spatial dimensions were reduced by adding a stride of 2 to 5 of the routed layers. GroupNorm and ReLU were used after each convolution and after each routed layer.

The model was regularized with Dropout and L2-regularization. For training, the Adam optimizer was used. Since the routing logits were updated only once every T steps (where T is the number of tasks), for T=20 it was found beneficial to use a larger learning rate for the routing logits than for the components. Thus, the learning rate for the routing logits was set to be T times larger than the one for the other weights, which worked well in practice. The training length was set to be larger than needed for the methods to attain their peak performance, select the best checkpoint for each method based on validation accuracy, and evaluate that single checkpoint on the test set.

A "shared bottom" variant was also trained, where all tasks use all components. A "no sharing" variant was not evaluated, since the number of tasks T was larger than the number of components per layer. A multi-task machine-learned model according to example aspects of the present disclosure was trained where Gumbel-Matrix routing was used to model the connections in each routed layer, with results shown in Table 2.

TABLE 2

Results on multitask Omniglot setup (mean and standard deviation of the error shown). Each experiment was run 10 times.

| Method | Valid. error (%) | Test error (%) |
|---|---|---|
| Single Task | 36.41 ± 0.53 | 39.19 ± 0.50 |
| Soft Ordering | 32.33 ± 0.74 | 33.41 ± 0.71 |
| CMTR | 11.80 ± 1.02 | 12.81 ± 1.02 |
| MoE | 7.95 ± 0.37 | 7.81 ± 0.54 |
| Shared bottom | 6.16 ± 0.50 | 6.75 ± 0.33 |
| Gumbel-Matrix | 5.69 ± 0.22 | 6.48 ± 0.28 |

The underlying non-routed model outperformed the Mixture-of-Experts (MoE) routing, likely due to Omniglot optimization difficulties outweighing the benefits of the MoE routing. In contrast to the systems and methods of the present disclosure, the Mixture-of-Experts framework hard-codes the required sparsity for each layer, which can bring immense computational savings but may also sacrifice accuracy. In some cases, the "shared bottom" variant would be prohibitively expensive to run, making the comparison infeasible.

A routed model based on Gumbel-Matrix routing according to example aspects of the present disclosure was trained. No auxiliary losses were used, and the model naturally removed some of the connections to allow for task-specific processing. While the network was not explicitly penalized for high routing entropy, connection probabilities still converged to be either close to 0 or close to 1. The resulting accuracy is shown in Table 2, which demonstrated that the Gumbel-Matrix routing improved the accuracy over a very strong "shared bottom" baseline.

The example systems, methods, and machine-learned models for multi-task learning of the present disclosure are able to learn the pattern of parameter sharing together with the model parameters using standard back-propagation. Experimental results showed that the example methods of the present disclosure can learn flexible sharing patterns, and adapt to the task relatedness, which results in significantly improved performances over the previous methods.

Example Devices and Systems

Figure 6A:
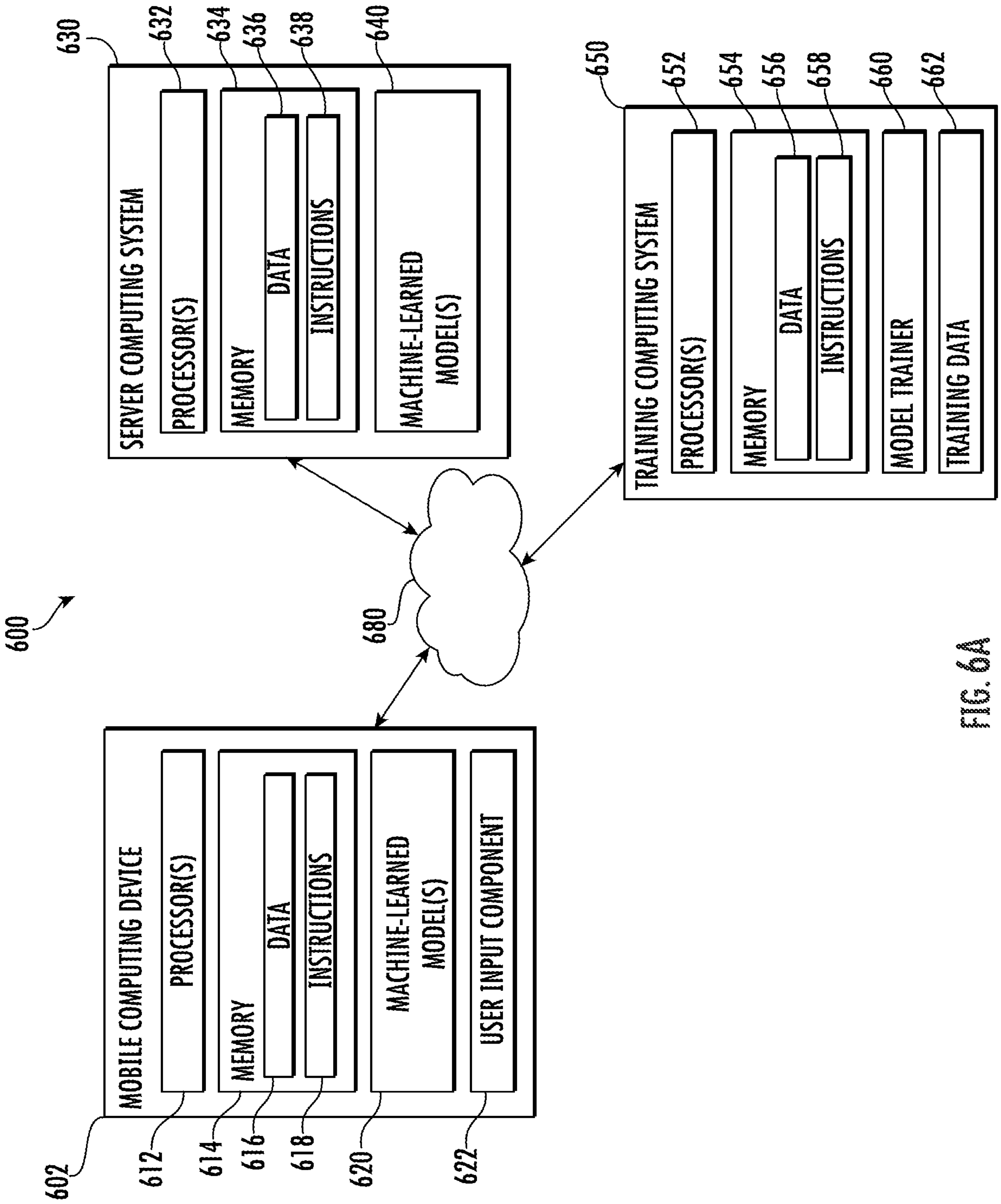
FIG. 6A depicts a block diagram of an example computing system according to example aspects of the present disclosure.

FIG. 6A depicts a block diagram of an example computing system 600 that trains and implements a multi-task machine-learned model according to example aspects of the present disclosure. The system 600 includes a user computing device 602, a server computing system 630, and a training computing system 650 that are communicatively coupled over a network 680.

The user computing device 602 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 602 includes one or more processors 612 and a memory 614. The one or more processors 612 can be any suitable processing device (e.g., a processor core, a microprocessor, an ASIC, a FPGA, a controller, a microcontroller, etc.) and can be one processor or a plurality of processors that are operatively connected. The memory 614 can include one or more non-transitory computer-readable storage mediums, such as RAM, ROM, EEPROM, EPROM, flash memory devices, magnetic disks, etc., and combinations thereof. The memory 614 can store data 616 and instructions 618 which are executed by the processor 612 to cause the user computing device 602 to perform operations.

In some implementations, the user computing device 602 can store or include one or more machine-learned models 620. The one or more machine-learned models 620 can be, for example, one or more multi-task machine-learned models, as described herein. For example, the machine-learned models 620 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 620 and/or components thereof are discussed with reference to FIGS. 3-5.

In some implementations, the one or more machine-learned models 620 can be received from the server computing system 630 over network 680, stored in the user computing device memory 614, and then used or otherwise implemented by the one or more processors 612.

More particularly, as described herein, the machine-learned models 620 can use a routing matrix of size T×C to select one or more components C, for each layer of a machine-learned model for each task T. For example, in some implementations, the one or more machine-learned models be trained using a connection probability matrix, and the routing matrix can be determined by selecting a maximum likelihood variant for each connection probability from the connection probability matrix as a corresponding binary value in the routing matrix.

Additionally or alternatively, one or more machine-learned models 640 can be included in or otherwise stored and implemented by the server computing system 630 that communicates with the user computing device 602 according to a client-server relationship. For example, the machine-learned models 640 can be implemented by the server computing system 640 as a portion of a web service. Thus, one or more models 620 can be stored and implemented at the user computing device 602 and/or one or more models 640 can be stored and implemented at the server computing system 630.

The user computing device 602 can also include one or more user input component 622 that receives user input. For example, the user input component 622 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input. The input component 622 can be used, for example, to manually select a particular task.

The server computing system 630 includes one or more processors 632 and a memory 634. The one or more processors 632 can be any suitable processing device (e.g., a processor core, a microprocessor, an ASIC, a FPGA, a controller, a microcontroller, etc.) and can be one processor or a plurality of processors that are operatively connected. The memory 634 can include one or more non-transitory computer-readable storage mediums, such as RAM, ROM, EEPROM, EPROM, flash memory devices, magnetic disks, etc., and combinations thereof. The memory 634 can store data 636 and instructions 638 which are executed by the processor 632 to cause the server computing system 630 to perform operations.

In some implementations, the server computing system 630 includes or is otherwise implemented by one or more server computing devices. In instances in which the server computing system 630 includes plural server computing devices, such server computing devices can operate according to sequential computing architectures, parallel computing architectures, or some combination thereof.

As described above, the server computing system 630 can store or otherwise include one or more machine-learned models 640. Example machine-learned models include neural networks or other multi-layer non-linear models. Example neural networks include feed forward neural networks, deep neural networks, recurrent neural networks, and convolutional neural networks. Example models 640 and/or components thereof are discussed with reference to FIGS. 3-5.

The user computing device 602 and/or the server computing system 630 can train the models 620 and/or 640 via interaction with the training computing system 650 that is communicatively coupled over the network 680. The training computing system 650 can be separate from the server computing system 630 or can be a portion of the server computing system 630.

The training computing system 650 includes one or more processors 652 and a memory 654. The one or more processors 652 can be any suitable processing device (e.g., a processor core, a microprocessor, an ASIC, a FPGA, a controller, a microcontroller, etc.) and can be one processor or a plurality of processors that are operatively connected. The memory 654 can include one or more non-transitory computer-readable storage mediums, such as RAM, ROM, EEPROM, EPROM, flash memory devices, magnetic disks, etc., and combinations thereof. The memory 654 can store data 656 and instructions 658 which are executed by the processor 652 to cause the training computing system 650 to perform operations. In some implementations, the training computing system 650 includes or is otherwise implemented by one or more server computing devices.

The training computing system 650 can include a model trainer 660 that trains the machine-learned models 620 and/or 640 stored at the user computing device 602 and/or the server computing system 630 using various training or learning techniques, such as, for example, SGD, backwards propagation of errors, reinforcement learning, or other techniques as described herein. In some implementations, performing backwards propagation of errors can include performing truncated backpropagation through time. The model trainer 660 can perform a number of generalization techniques (e.g., weight decays, dropouts, etc.) to improve the generalization capability of the models being trained.

In particular, the model trainer 660 can train the machine-learned models 620 and/or 640 based on a set of training data 662. The training data 662 can include, for example, training datasets including ground-truth outputs, specific training datasets (e.g., MNIST, MNIST-rot, Omniglot, etc.) and/or other training data as described herein.

In some implementations, if the user has provided consent, the training examples can be provided by the user computing device 602. Thus, in such implementations, the model 620 provided to the user computing device 602 can be trained by the training computing system 650 on user-specific data received from the user computing device 602, while protecting the privacy of the individual user's data. In some implementations, this process can be referred to as personalizing the model.

In some implementations, parameters trained locally on a user computing device 602 can be communicated to the server computing system 630 and/or the training computing system 650 in a federated learning context. For example, a plurality of parameter sets from a plurality of user computing devices 602 can be communicated to the server computing system 630 and/or the training computing system 650, and the server computing system 630 and/or the training computing system 650 can train a global set of parameters using the plurality of parameter sets from the plurality of user computing devices 602. The newly trained global set of parameters can then be communicated to the user computing devices 602.

The model trainer 660 includes computer logic utilized to provide desired functionality. The model trainer 660 can be implemented in hardware, firmware, and/or software controlling a general-purpose processor. For example, in some implementations, the model trainer 660 includes program files stored on a storage device, loaded into a memory and executed by one or more processors 652. In other implementations, the model trainer 660 includes one or more sets of computer-executable instructions that are stored in a tangible computer-readable storage medium such as RAM hard disk or optical or magnetic media.

The network 680 can be any type of communications network, such as a local area network (e.g., intranet), wide area network (e.g., Internet), or some combination thereof and can include any number of wired or wireless links. In general, communication over the network 680 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 6A illustrates one example computing system that can be used to implement the present disclosure. Other computing systems can be used as well. For example, in some implementations, the user computing device 602 can include the model trainer 660 and the training dataset 662. In such implementations, the machine-learned models 620 can be both trained and used locally at the user computing device 602. In some implementations, the user computing device 602 can implement the model trainer 660 to personalize the machine-learned models 620 based on user-specific data.

Figure 6B:
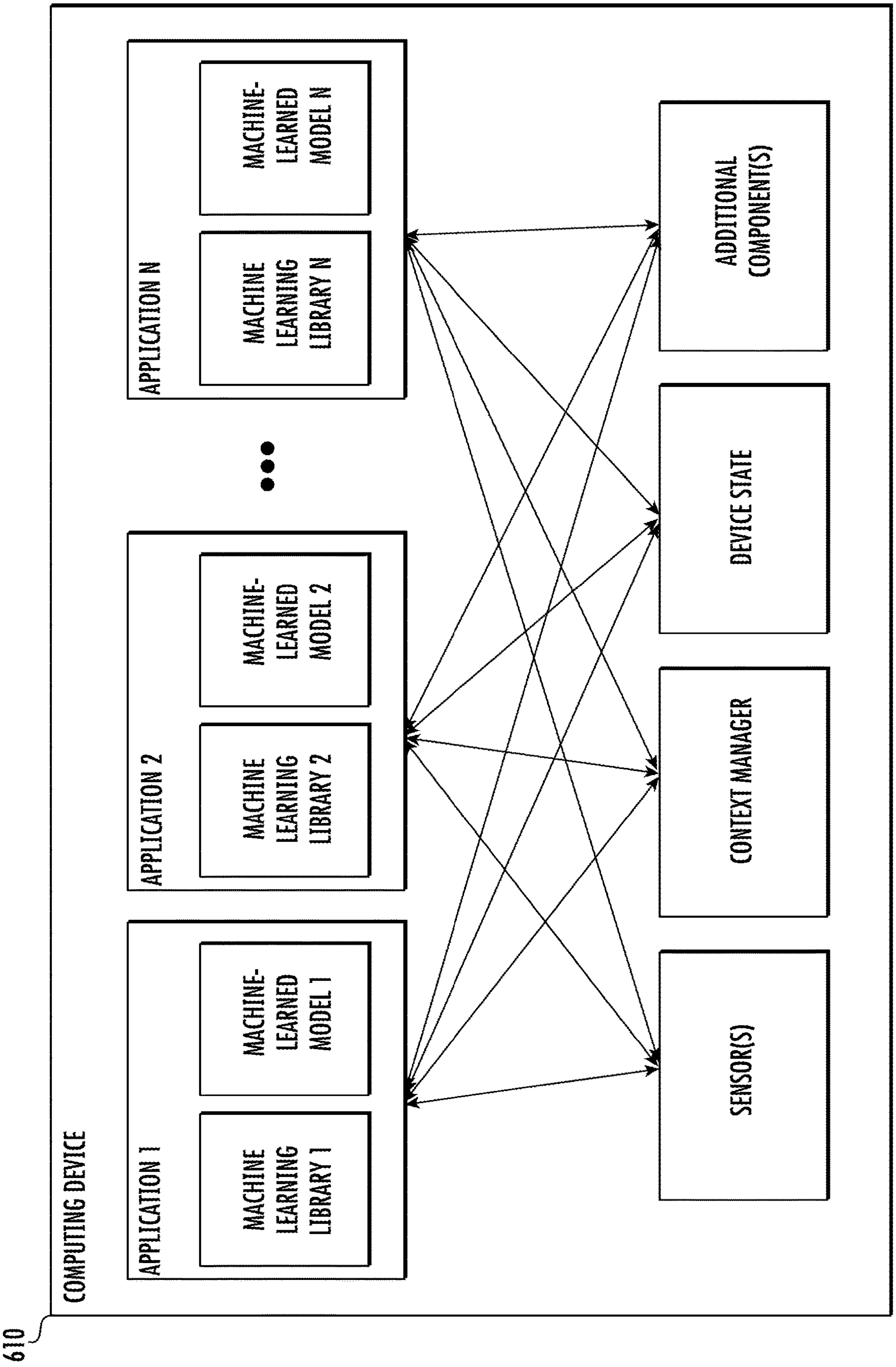
FIG. 6B depicts a block diagram of an example computing device according to example aspects of the present disclosure.

FIG. 6B depicts a block diagram of an example computing device 610 according to example aspects of the present disclosure. The computing device 610 can be a user computing device or a server computing device.

The computing device 610 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 6B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 6C:
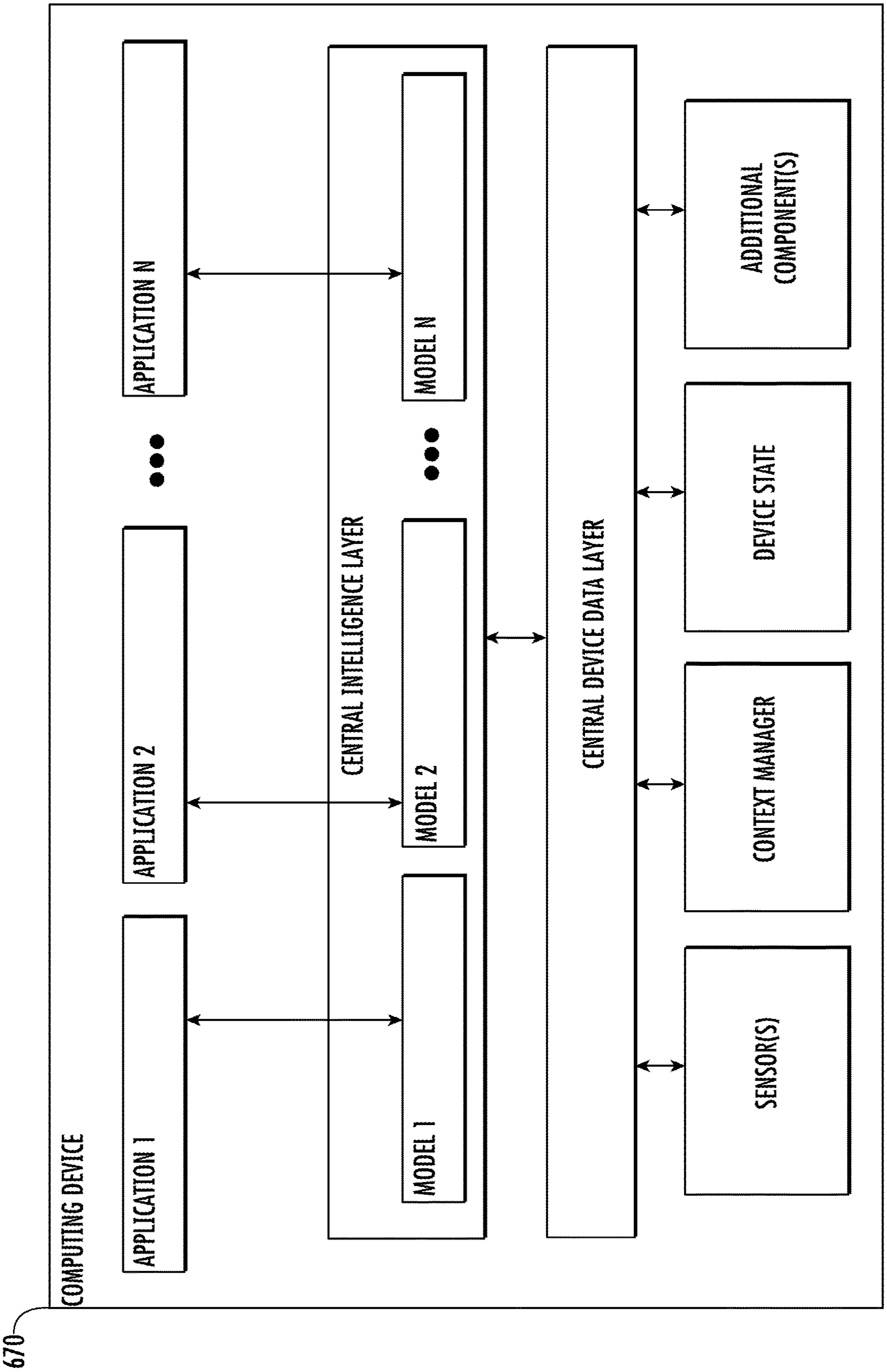
FIG. 6C depicts a block diagram of an example computing device according to example aspects of the present disclosure.

FIG. 6C depicts a block diagram of an example computing device 670 according to example aspects of the present disclosure. The computing device 670 can be a user computing device or a server computing device.

The computing device 670 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 6C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 670.

The central intelligence layer can communicate with a central device data layer. The central device data layer can be a centralized repository of data for the computing device 670. As illustrated in FIG. 6C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 7:
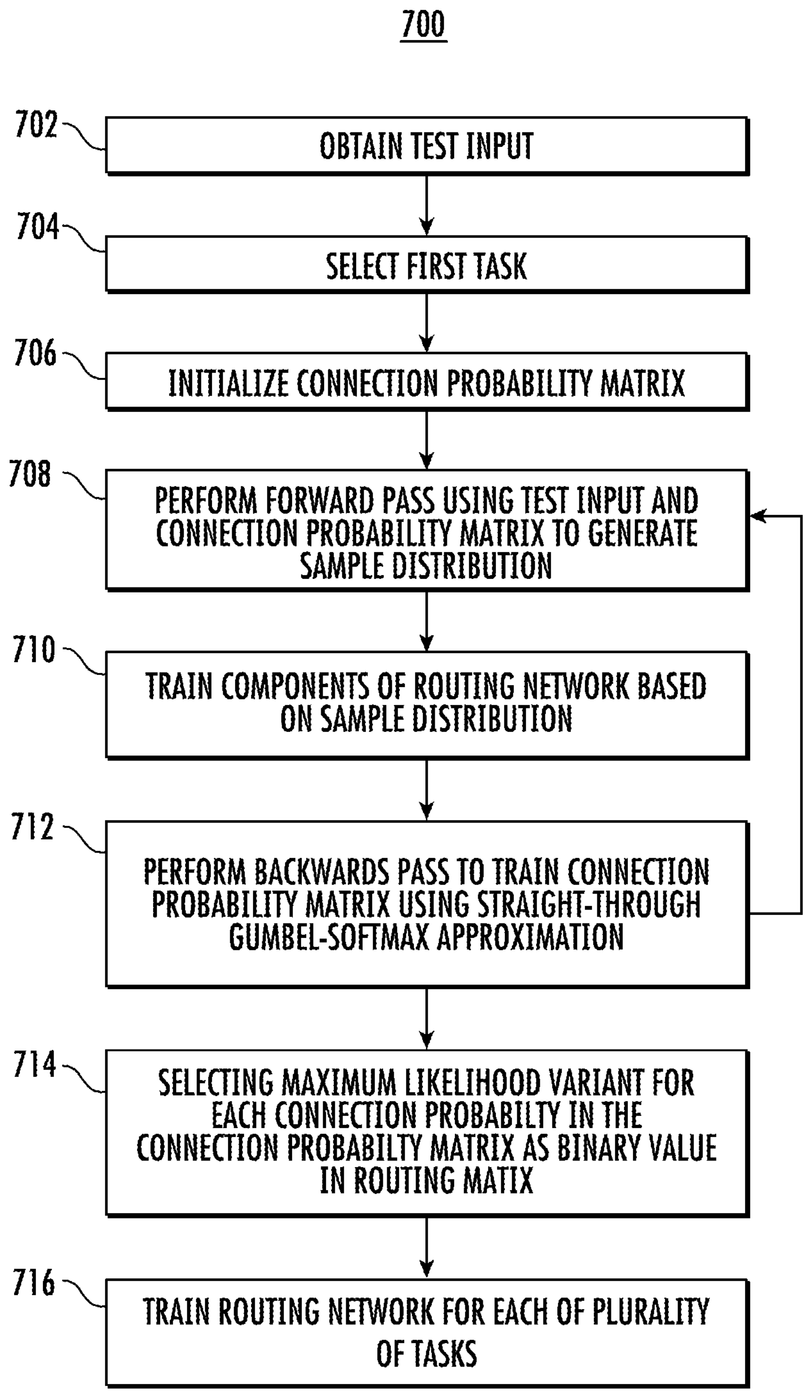
FIG. 7 depicts a flow chart diagram of an example method according to example aspects of the present disclosure.

FIG. 7 depicts a flow chart diagram of an example method 700 to train a machine-learned model, such as a multi-task machine-learned model, according to example aspects of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, the method 700 can include obtaining a test input. The test input can be, for example, a test input from a test database. For example, in some implementations, the test input can be a part of the MNIST, MNIST-rot, Omniglot, or other test database. In some implementations, the test input can have an associated ground-truth output in the test database.

At 704, the method 700 can include selecting a first task. For example, training of a multi-task machine-learned model can be conditioned on a task id, as described herein.

At 706, the method 700 can include initializing a connection probability matrix. For example, the connection probability matrix can be a matrix indicative of a probability of a particular component being activated such that an input into the machine-learned model is routed through the activated components to generate an output.

In some implementations, each connection probability in the connection probability matrix can include two complementary logits. In some implementations, initializing the connection probability matrix can include selecting an initial value for each connection probability in the connection probability matrix. In some implementations, the initial value for each connection probability can be approximately 0.5. As used herein, the term "approximately" can mean within 20% of the stated value. In some implementations, the initial value for each connection probability can be selected to encourage or discourage a particular routing pathway. In some implementations, the initial value for each connection probability can be set close to 1 (e.g., 0.8 or above) in order to enhance the trainability of the components and to stabilize the initial learning phases of training.

The machine-learned model can then be trained for the first task. For example, at 708, the training method can include performing a forward pass using the test input and the connection probability matrix to generate a sample distribution of test outputs. In some implementations, performing the forward pass can include, for each of a plurality of different routing matrices, routing the test input through the activated components in each layer of the machine-learned model according to the respective routing matrix to generate a respective test output. For example, each of the different routing matrices can be a binary matrix indicative of which components are activated. The different routing matrices of the plurality can be determined based at least in part on the connection probability matrix. The sample distribution of test outputs can be generated by sampling the plurality of test outputs according to the connection probability matrix.

In some implementations, performing the forward pass using the test input in the connection probability matrix can include inputting the test input into one or more activated components of a first layer of the machine-learned model according to the particular routing matrix. A respective output can be received for each of the one or more activated components. The respective outputs can be aggregated into an aggregated output. For example, in some implementations, aggregating the respective outputs into an aggregated output can include averaging the respective outputs. In some implementations, the aggregated output can then be input into one or more activated components of a successive (e.g., second) layer of the machine-learned model. For example, the respective outputs for each layer can be aggregated into an aggregated output which is input into one or more activated components of a successive layer until an aggregated output for a final layer is generated. In some implementations, the aggregated output (e.g., of a final layer) can be input into a task-specific head to generate a test output.

At 710, the method 700 can include training the components of the machine-learned model based at least in part on the sample distribution. For example, one or more activated components for a forward pass can be trained using back propagation, such as gradient descent.

At 712, the method 700 can include performing a backwards pass to train the connection probability matrix using an approximation. For example, in some implementations, the approximation can be a straight-through Gumbel-softmax approximation. In some implementations, the approximation can be a reinforcement learning (RL) approximation. For example, in some implementations, performing a backwards pass can include reparameterizing the sample distribution of test outputs from a Bernoulli distribution to a Gumbel distribution. For example, reparameterizing the sample distribution from the Bernoulli distribution to the Gumbel distribution can include adding independent noise from the Gumbel distribution to each of the logits and selecting the binary value with the highest logit as the sample distribution. If a connection is sampled to be inactive, the corresponding component will not get a gradient, but its output will be used to compute the gradient for the connection probability.

In some implementations, training the machine-learned model for the particular task can include training the machine-learned model for the particular task using a budget penalty. For example, the budget penalty can penalize the machine-learned model for exceeding a given computational budget.

In some implementations, following performing the backwards pass, the method 700 can include returning to 708 to perform a plurality of training iterations.

At 714, upon completion of one or more iterations, the method 700 can include selecting a maximum likelihood variant for each connection probability in the connection probability matrix as a corresponding binary value in the routing matrix to be used for inference.

At 716, the method 700 can include training the machine-learned model for each task in the plurality of tasks. For example, upon completion of training for a first task, a second task from the plurality of tasks can be selected for training. Training can then proceed through each of the tasks independently until the machine-learned model has been trained for each of the plurality of tasks.

Figure 8:
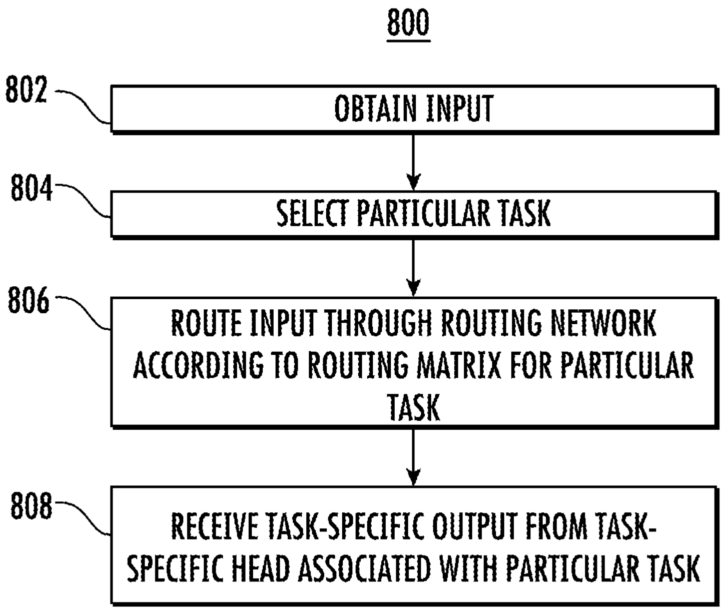
FIG. 8 depicts a flow chart diagram of an example method according to example aspects of the present disclosure.

FIG. 8 depicts a flow chart diagram of an example method 800 to use a machine-learned model, such as a multi-task machine-learned model, according to example aspects of the present disclosure. The multi-task machine-learned model can be configured to perform a plurality of tasks T, and can include plurality of layers L. Each layer can include a plurality of components C. The multi-task machine-learned model can also include a routing matrix of size T×C for each respective layer. The routing matrix can be a matrix of binary allocation variables descriptive of which components of the layer an input into the machine-learned model is routed through to generate an output. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, the method 800 can include obtaining an input. The input can be, for example, an input to be analyzed by one or more tasks of the multi-task machine-learned model.

At 804, the method 800 can include selecting a particular task. In some implementations, the particular task can be selected based at least in part on a user input. In some implementations, each task can be selected sequentially, such as upon completion of analysis of the input of a previous task. For example, each of the plurality of tasks can analyze the input.

At 806, the method 800 can include routing the input through the machine-learned model according to the routing matrix for the particular task. For example, the machine-learned model can have been trained using a straight-through Gumbel-softmax approximation to jointly learn the routing matrix with the plurality of components using back-propagation.

In some implementations, routing the input through the machine-learned model according to the routing matrix can include inputting the input into one or more activated components of a first layer of the machine-learned model according to the routing matrix. A respective output of the one or more activated components can be received. In some implementations, the respective outputs can be aggregated into an aggregated output, such as an averaged output.

In some implementations, routing the input through the machine-learned model can further include inputting the aggregated output into one or more activated components of a successive layer of the machine-learned model according to the routing matrix for the successive layer. A respective successive output can be received as an output of the one or more activated components. The respective successive outputs can be aggregated into an aggregated successive output. Each aggregated successive output can be input into a successive layer until an aggregated final output is determined following a final layer.

At 808, the method 800 can include receiving a task-specific output from a task-specific head associated with the particular task. For example, an aggregated final output can be input into the associated task-specific head of the machine-learned model to generate a task-specific output.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for performing tasks using multi-task machine-learned models, comprising:

at least one processor; and at least one tangible, non-transitory computer-readable medium that stores instructions that, when executed by the at least one processor, cause the at least one processor to perform operations, the operations comprising:

obtaining an input associated with a respective task; and generating, using a multi-task machine-learned model comprising one or more active components and one or more inactive components, an output, wherein the output is generated based on routing, on a per-task basis, the input only through the one or more active components, the one or more active components selectively activated based on a respective routing value associated with the respective task;

wherein the respective routing value was obtained by learning a connection value corresponding to a probability of the one or more active components improving a performance on the respective task, wherein the connection value was learned by executing a forward pass using the connection value and updating the connection value based on the forward pass.

2. The computing system of claim 1, wherein the connection value is obtained using a Gumbel-Softmax reparameterization to approximate sampling from a Bernoulli distribution.

3. The computing system of claim 1, wherein the respective routing value is a binary value.

4. The computing system of claim 3, wherein a respective layer of the multi-task machine-learned model comprises a plurality of components comprising the one or more active components and the one or more inactive components, and wherein the respective layer is associated with a second respective routing value, the respective routing value activating a first respective component of the one or more active components and the second respective routing value activating a second respective component of the one or more active components.

5. The computing system of claim 1, wherein routing the input through the multi-task machine-learned model according to the respective routing value is conditioned on a task identifier for the respective task.

6. The computing system of claim 1, wherein the respective routing value is indexed in association with the respective task.

7. The computing system of claim 4, wherein:

the multi-task machine-learned model is associated with a matrix of values having:

a first dimension associated with a plurality of tasks;

a second dimension associated with the plurality of components; and a third dimension associated with one or more layers, the one or more layers including the respective layer; and the operations comprise:

retrieving, based on the input, the respective routing value from the matrix of values.

8. The computing system of claim 4, wherein:

the multi-task machine-learned model is associated with a matrix of values having:

a first dimension associated with a plurality of tasks;

a second dimension associated with the plurality of components; and a third dimension associated with one or more layers, the one or more layers including the respective layer; and the operations comprise:

retrieving, based on the input, a connection value from the matrix of values; and obtaining the respective routing value based on the connection value.

9. A computing system for training multi-task machine-learned models, comprising:

at least one processor; and at least one tangible, non-transitory computer-readable medium that stores instructions that, when executed by the at least one processor, cause the at least one processor to perform operations, the operations comprising:

obtaining an input associated with a respective task for inputting to a multi-task machine-learned model comprising a plurality of components in a layer;

obtaining a connection value corresponding to a probability of a respective component of the plurality of components improving a performance of the multi-task machine-learned model on the respective task;

obtaining a binary routing value using the connection value;

generating, in a forward pass of the multi-task machine-learned model comprising one or more active components and one or more inactive components, a model output, wherein the model output is generated based on routing, on a per-task basis, the input only through the one or more active components, the one or more active components selectively activated based on the binary routing value;

backpropagating a loss based on the model output;

updating the connection value based on a gradient of the loss backpropagated through the one or more active components of the multi-task machine-learned model for performing the forward pass.

10. The computing system of claim 9, wherein the binary routing value is obtained in the forward pass using an argmax operation, and wherein the backpropagation is based on a softmax operation used in place of the argmax operation.

11. The computing system of claim 9, wherein the binary routing value is indexed in association with the respective task.

12. The computing system of claim 11, wherein:

the multi-task machine-learned model is associated with a matrix of values having:

a first dimension associated with a plurality of tasks;

a second dimension associated with the plurality of components; and a third dimension associated with one or more layers, the one or more layers including the respective layer; and the operations comprise:

retrieving, based on the input, the connection value from the matrix of values.

13. The computing system of claim 11, wherein:

the multi-task machine-learned model is associated with a matrix of values having:

a first dimension associated with a plurality of tasks;

a second dimension associated with the plurality of components; and a third dimension associated with one or more layers, the one or more layers including the respective layer; and the operations comprise:

retrieving, based on the input, the binary routing value from the matrix of values.

14. The computing system of claim 9, wherein obtaining the connection value is conditioned on a task identifier for the respective task.

15. At least one tangible, non-transitory computer-readable medium that stores instructions that, when executed by at least one processor, cause the at least one processor to perform operations, the operations comprising:

obtaining an input associated with a respective task; and generating, using a multi-task machine-learned model comprising one or more active components and one or more inactive components, an output, wherein the output is generated based on routing, on a per-task basis, the input only through the one or more active components, the one or more active components selectively activated based on a respective routing value associated with the respective task;

wherein the respective routing value was obtained by learning a connection value corresponding to a probability of the one or more active components improving a performance on the respective task, wherein the connection value was learned by executing a forward pass using the connection value and updating the connection value based on the forward pass.

16. The computing system of claim 1, wherein the operations comprise:

selecting, based on the connection value, a binary value as the respective routing value, wherein the selecting comprises:

generating a first logit based on the connection value; and generating a second logit based on the connection value;

wherein the selected binary value is associated with the larger of the first logit or the second logit.

17. The computing system of claim 9, wherein obtaining the binary routing value using the connection value comprises:

generating a first logit based on the connection value; and generating a second logit based on the connection value;

wherein the binary routing value is associated with the larger of the first logit or the second logit.

18. The computing system of claim 9, the operations comprising:

generating outputs from one or more inactive components of the multi-task machine-learned model that were not used to generate the model output; and backpropagating the loss based on the outputs from one or more inactive components that were not used to generate the model output.

19. The computing system of claim 1, wherein the multi-task machine-learned model is a mixture-of-experts model, and wherein the one or more active components correspond to one or more experts.

20. The computing system of claim 1, the operations comprising:

obtaining a second input associated with a second respective task different from the respective task; and generating, using the multi-task machine-learned model comprising one or more second active components and one or more second inactive components, a second output, wherein the second output is generated based on routing, on a per-task basis, the second input only through the one or more second active components different from the one or more active components, the one or more second active components selectively activated based on a second respective routing value associated with the second respective task.

* * * * *